INVENTOR.
John L. Jennings

Aug. 16, 1966  J. L. JENNINGS  3,266,241
PROPELLANT INJECTOR

Filed July 29, 1963  2 Sheets-Sheet 2

INVENTOR.
John L. Jennings

United States Patent Office 3,266,241
Patented August 16, 1966

3,266,241
PROPELLANT INJECTOR
John L. Jennings, Cupertino, Calif., assignor to United Aircraft Corporation, East Hartford, Conn., a corporation of Delaware
Filed July 29, 1963, Ser. No. 298,327
7 Claims. (Cl. 60—35.6)

The present invention relates to a liquid propellant injector and more particularly to an injector for providing uniformly aerated propellants to the combustion chamber of a rocket motor.

In the application of certain missiles and space systems, it is necessary to provide a capability for wire-range throttling of thrust output. Current space missions require that engine thrust be varied as much as from one-tenth to full thrust; and prospective space mission, such as orbital rendezvous and lunar landings, call for thrust variation of at least thirty to one. Present state-of-the-art techniques effect thrust modulation by decreasing the injection pressure through line throttling or decreasing injector port area or both. In the former approach, the injection velocity drops rapidly as the flow is throttled, resulting in a deterioration of the mixing pattern and, consequently inefficient performance. As the flow rate drops further, the propellants, in effect, dribble into the chamber rather than spray, causing severe combusion instability. In the latter approach, serious reliability problems exist because variable area injectors have complex moving parts which are susceptible to heat failure by virtue of their location at the injector face.

A comparatively new concept in thrust variation calls for the addition of a gas phase to a propellant in order to reduce the mass flow rate of propellant without materially altering the velocity of injection of the propellant into the combustion chamber. For example, as described in U.S. Patent Number 3,045,425 by G. Morrell an inert gas is injected into the propellant feed lines to foam the propellant which continues to flow through the feed lines at substantially the same velocity, but at a reduced mass rate of flow.

However, it has been found that in propellant systems having two-phase flow the intricate passage work in the injectors produces centrifugal separation of the two phases whereby the separated phases passs out of the orifices and into the combustion chamber in an alternate manner. The large bubbles that often form in the line disrupt the injection pattern and result in an oscillating or chugging effect which can, in extreme cases, set up catastrophic vibration.

It is the general purpose of this invention to provide an improved liquid propellant injector which substantially mitigates the coalescence effect in gross aeration throttling systems. To attain this end, the injector of the present invention provides means in the injector feed lines and internal to the feed channels to break up coalesced bubbles and redistribute them into the liquid phase. As a consequence, the homogeneity of the two-phase fluid injected into the combustion chamber is substantially improved without adding materially to the complexity of the injector design.

An object, therefore, of the present invention is to provide a liquid propellant injector for producing stable combustion with gas-liquid propellant mixtures.

A further object of the present invention is the provision of a liquid propellant injector which will inhibit the formation of coalesced bubbles from a two-phase propellant mixture.

A still further object is the provision of a liquid propellant injector which is comparatively simple in design.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
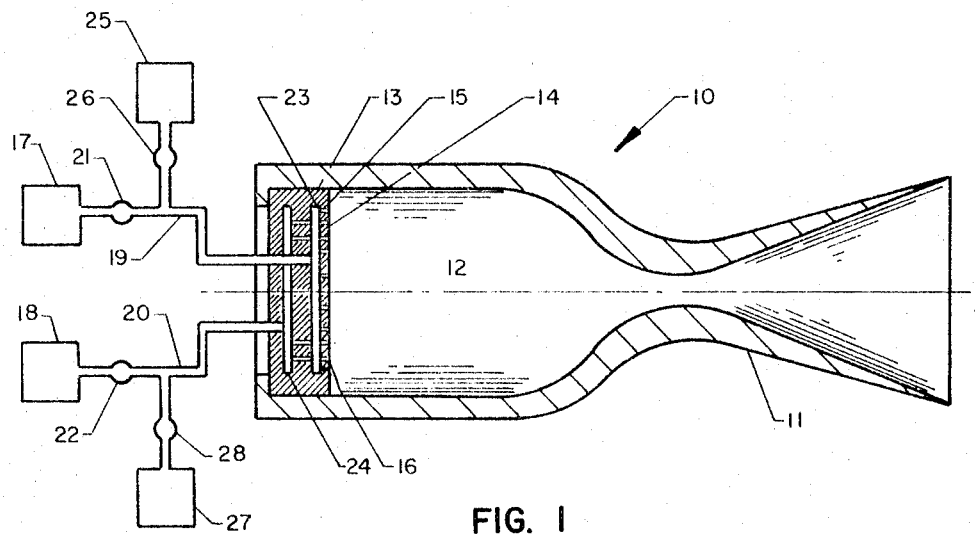
FIG. 1 illustrates a prior art gross aeration throttling system for liquid propellant motors.

In FIG. 1 is shown a prior art system employing a conventional rocket engine thrust chamber 10 comprised of a nozzle 11, a combustion chamber 12, and an injector 13. The injector 13 has a face 14 with orifices 15 for the injection of a liquid fuel and orifices 16 for the injection of a liquid oxidizer. Tanks 17 and 18 are provided with fuel and oxidizer, respectively, which are caused to flow to the orifices 15 and 16 through lines 19 and 20 by opening valves 21 and 22. The motivating source for impelling the propellants from their respective tanks may be any one of a number of means well known in the art such as pressurizing said tanks with an inert gas. An example of a suitable bi-propellant system comprises hydrazine as a fuel which is stored in tank 17 and nitrogen tetroxide as an oxidizer which is stored in tank 18.

In accordance with the method of operation of this system, valve 21 is opened to admit hydrazine from tank 17 through line 19 into injector fuel cavity or channel 23 and into the combustion chamber 12 by injection through ports 15. In a similar manner, the nitrogen tetroxide is caused to flow through line 20 into injector oxidizer cavity or channel 24 and out injector orifices 16 whereupon the hydrazine impinges upon the stream of nitrogen tetroxide and ignition and combustion take place producing the necessary working fluid for propulsion of the reaction motor system. Since the thrust engine is performing at its maximum thrust level and it becomes necessary to reduct the thrust level, this prior art system calls for the injection of a density-control medium stored in tank 25 into line 19 by selectively opening the valve 26. In a like manner, the oxidizer density is regulated by injecting the density-control medium contained in tank 27 to line 20 by opening valve 28. However, the components of the resultant fuel and oxidizer mixtures, by virtue of their distinct density differences, have a tendency to separate or coalesce. This is especially so at any point where the fluid changes flow direction to cause centrifugal separation. Consequently, the mixtures loss homogeneity necessary for smooth unchoked flow through the injector orifices 15 and 16. Such a condition is conductive to overheating of the injector and produces low frequency injector instability or "chugging" which can set up engine oscillations to produce motor failure if not catastrophic burning.

In accordance with the present invention, the instability, inefficiency, and heating problems of the prior methods have been substantially alleviated as hereinafter described in detail.

Figure 2:
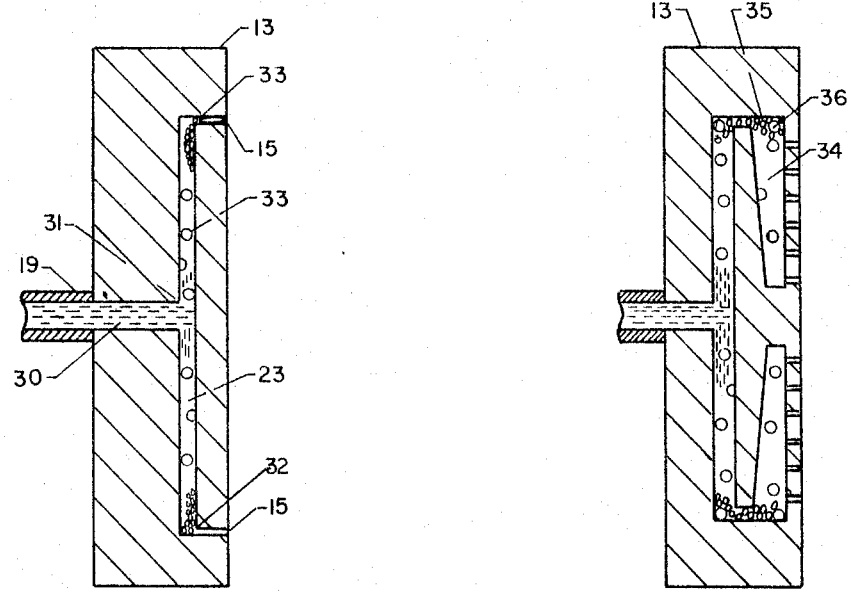
FIGS. 2 and 3 show in cross-section enlarged views of typical liquid motor injectors.

In FIG. 2 the coalescence effect in one of the injector channels is shown in greater detail. Injector 13 is provided with feed line 19 which connects to channel 23 feeding orifices 15. However, as discussed above, wherever the glass-liquid mixture 30 in line 19 undergoes any change in fluid flow direction, sush as at corners 31 and 32, the gas phase tends to separate out and forms large bubbles 33. As a result the combustion chamber is furnished with a high concentration of propellant at one moment and at the next it receives a surge of gas due to the large bubbles formed in the line. This variation in the mass flow rate from an orifice set up a cycling motion and at certain flow velocities of propellant the oscillation which results can cause total engine failure.

Figure 3:
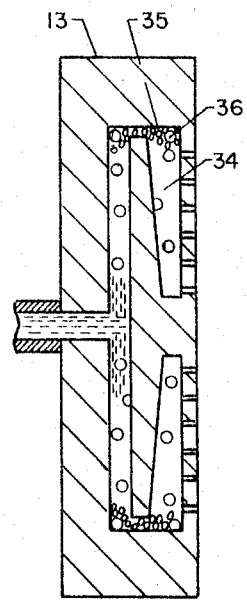

In FIG. 3 an injector 13 is shown in cross-section having a more intricate channelling structure 34 which is necessary in many instances where a multiplicity of channels are located in an injector head. At point 35 the full 180° change in fluid flow direction produces severe separation problems whereby large bubbles 36 form and produce combustion instability.

Figure 4:
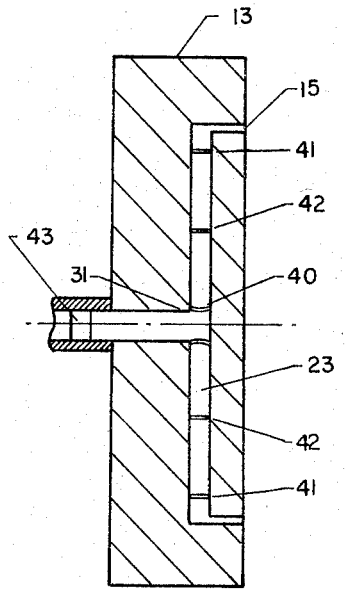
FIGS. 4 and 5 show the same injector as in FIGS. 2 and 3, but with the improvement of the present invention.

In FIG. 4 is shown the improvement of the present invention whereby the drastic coalescence effect brought about by change in direction of fluid movement is substantially mitigated. The injector 13 is substantially identical to that of FIG. 2 except that in channel 23 at corner 31 screen 40 is provided to break up any bubbles that form from coalescence gas phase and redistribute these bubbles into the liquid phase producing a substantially consistent mixture of gas and liquid. Consequently the propellant mixture passing through the orifices are devoid of any large bubbles that produce combustion instability or chugging. Depending upon the length of the channels, additional means 41 and 42 for destroying large bubble formations may be employed. Moreover the feed line 19 may require similar means 43 to inhibit coalescence.

Figure 5:
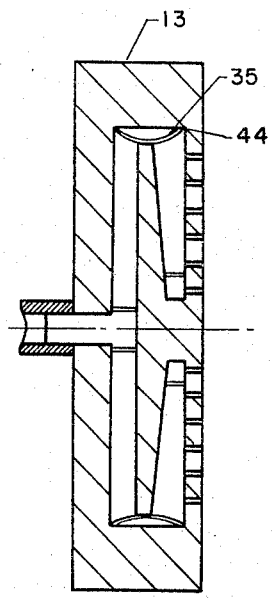

In FIG. 5 the severe coalescence problem produced at corner 35 is rectified by placement of gas redistribution means 44 at this point. Again the gas is redistributed into the liquid phase producing thereby a uniform gas-liquid mixture essential to successful engine performance.

Figures 6, 7, 8:
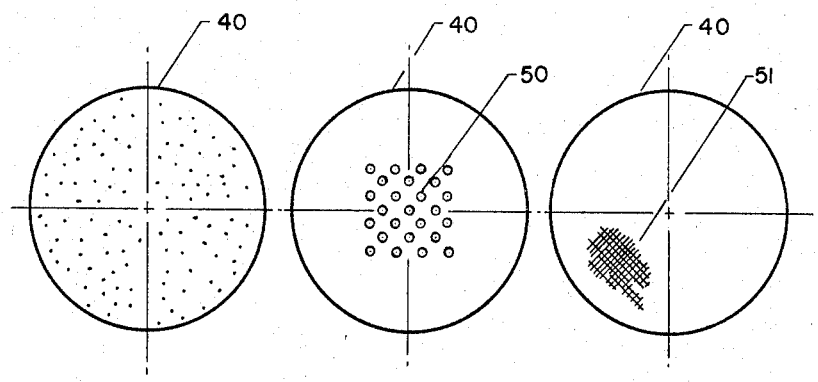
FIGS. 6, 7 and 8 show exemplary materials from which the improvement of the present invention can be made.

In FIG. 6 gas redistribution means 40 for placement in channel 23, is shown to be made from porous substance such as sintered alumina or powdered metals.

In FIG. 7 the gas redistribution means is shown comprised of an annular disc of metal or other suitable materials with perforations 50 located therein. The large bubbles are forced to break up in passing through the many perforations 50 and are, as a consequence, redistributed into the liquid phase.

In FIG. 8 the gas redistribution means 40 is shown comprised of an annular section of screen or hardware cloth having openings 51 to break up coalescence bubbles.

It should be understood that the various means for breaking down bubble formation could take a variety of forms not specifically shown above. In addition the channels such as 23 of FIG. 4 in the injector need not be simple cylindrical passages, but may be annular recesses requiring the gas redistribution means 41 to be toroidal or ring shaped to completely circumscribe the fluid channel.

Obviously, many modifications and variations of the present invention are possible in light of the above teachings. The structural systems described for carrying out the method of the present invention are merely exemplary and many alternative structural forms may be employed for practice of the instant invention. It is, therefore, to be understood that within the scope of the appended claims the invention may be practiced otherwise than is specifically described.

Having thus described the invention, what is claimed is:

1. In a liquid propellant injection system of injecting a propellant into a combustion chamber comprising a source of liquid propellant, a propellant injector having a plurality of fluid passages therethrough and at least one injection orifice in fluid communication with each of said passages, fluid conducting means connecting said source of liquid propellant to said propellant injector and means for injecting a gaseous density control medium into said liquid propellant downstream from said source of liquid propellant and upstream of said propellant injector whereby a gas-liquid of lower density than said liquid propellant is formed for injection into said combustion chamber, the improvement comprising means, located in said fluid passages at a plurality of predetermined points downstream from said means for injecting a gaseous density control medium, for breaking up coalesced gas phase whereby the gas liquid medium flowing through said injection orifice is substantially uniform.

2. A liquid propellant injection system as in claim 1 wherein said means located in said fluid passages is a porous body extending substantially across the full area of the each of said passages.

3. A liquid propellant injection system as in claim 1 wherein said means located in said fluid passages is a perforated body extending substantially across the full areas of each of said passages.

4. A liquid propellant injection system as in claim 1 wherein said means located in said fluid passages is a screen extending substantially across the full area of each of said passages.

5. A liquid propellant system comprising:
 (a) a source of liquid propellant
 (b) a combustion chamber
 (c) a propellant injector having at least one injector orifice opening into said combustion chamber
 (d) fluid conducting means in fluid communicating relationship between said source of liquid propellant and said injector orifice
 (e) means for injecting a gaseous density control medium into said fluid conducting means upstream of said injector orifice to form a gas-liquid mixture therein and
 (f) a plurality of means for breaking up coalesced gas phase in said fluid conducting means, said means being so disposed in said fluid conducting means to provide a uniform gas-liquid mixture flow into said combustion chamber.

6. In a liquid propellant injection system for injecting a propellant into a combustion chamber comprising a source of liquid propellant, a propellant injector having a plurality of fluid passages therethrough and at least one injection orifice in fluid communication with each of said passages, said passages having at least one change of direction, fluid conducting means connecting said source of liquid propellant to said propellant injector and means for injecting a gaseous density control medium into said liquid propellant downstream from said source of liquid propellant and upstream of said propellant injector whereby as gas-liquid mixture of lower density than said liquid propellant is formed for injection into said combustion chamber, the improvement comprising means, located in said fluid passages at said direction change, for breaking up coalesced gas phase whereby the gas-liquid medium flowing through said injection orifice is substantially uniform.

7. A liquid propellant system comprising:
 (a) a source of liquid propellant
 (b) a combustion chamber (c) a propellant injector having at least one injector orifice opening into said combustion chamber
(d) fluid conducting means in fluid communicating relationship between said source of liquid propellant and said injector orifice, said fluid conducting means having at least one direction change
(e) means for injecting a gaseous density control medium into said fluid conducting means upstream of said injector orifice to form a gas-liquid mixture therein and
(f) means for breaking up coalesced gas phase located in said fluid conducting means at said direction change, whereby uniform gas-liquid mixture flow into said combustion chamber is provided.

References Cited by the Examiner

UNITED STATES PATENTS

| | | | |
|---|---|---|---|
| 2,119,906 | 6/1938 | Dorman | 222—190 X |
| 2,405,785 | 8/1946 | Goddard | 60—35.6 X |
| 2,487,435 | 11/1949 | Goddard | 60—39.74 X |
| 3,010,613 | 11/1961 | Stossel | 222—190 |
| 3,085,394 | 4/1963 | Handley | 60—35.6 |
| 3,166,900 | 1/1965 | Stegen | 60—35.6 |

MARK NEWMAN, *Primary Examiner.*

SAMUEL LEVINE, *Examiner.*

D. HART, *Assistant Examiner.*